Dec. 31, 1929.　　　G. A. LA ROCQUE　　　1,741,782
METAL HANDLING APPARATUS
Filed July 19, 1927
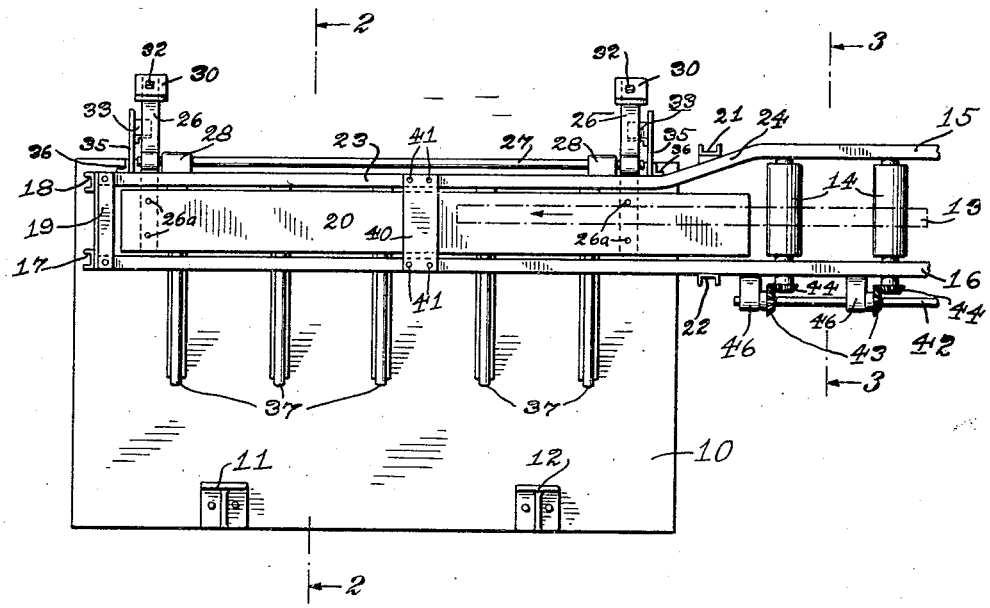

Patented Dec. 31, 1929

1,741,782

UNITED STATES PATENT OFFICE

GEORGE A. LA ROCQUE, OF HARTFORD, CONNECTICUT

METAL-HANDLING APPARATUS

Application filed July 19, 1927. Serial No. 206,972.

This invention relates to metal handling apparatus, and more particularly to a machine for laterally transferring metal billets from the end of a mechanical conveyor to a receiving platform located below and at one side of said conveyor.

One object of this invention is to provide a billet transferring apparatus of the above nature having a tipping plate adapted to be automatically tilted into an inclined position by the weight of the billet to permit the latter to slide downwardly upon the receiving platform.

A further object is to provide a tipping plate of the above nature adapted to be normally held in horizontal position by counterweighted levers.

A further object is to provide an apparatus of the above nature which will be simple in construction, inexpensive to manufacture, easy to install and manipulate, compact, automatic in operation, and very efficient and durable in use.

With these and other objects in view there has been illustrated on the accompanying drawings one form in which the invention may be conveniently embodied in practice.

Fig. 1 represents a top plan view of the billet transferring mechanism.

Fig. 2 is an end sectional view of the same, the section being taken along the line 2—2 of Fig. 1, looking in the direction of the arrows.

Fig. 3 is an end sectional view of the same, taken along the line 3—3 of Fig. 1.

In the manufacture of strip steel, it is customary to first roll the ingots into long billets generally about 40 feet in length, which are then cut into shorter billets by suitable shearing mechanism before being rolled into strips of the final thickness desired.

The present invention relates to apparatus for transferring the shorter billets after they have been cut by the shearing machine along power-conveyor rolls until said billets slide upon a tipping plate. The tipping plate is pivotally mounted so that it is adapted to automatically swing downwardly under the weight of the billets, whereupon the billets will drop down by gravity upon a receiving platform located at one side of the apparatus.

The present invention entirely eliminates the use of the steam pushers formerly employed to move the sheared billets from the end of the conveyor, and at the same time causes the billets to be stacked up upon the receiving platform exactly parallel to each other, thus making it much easier to remove the billets therefrom for any desired succeeding operations.

One advantage of the present invention is that the labor of four men will be eliminated. In one installation, for example, it has been estimated that over 600,000 pounds of billets can be sheared in a day, whereas with a former type of machine of the same size only 100,000 pounds could be sheared in the same time interval.

Referring now to the drawings in which like reference numerals denote corresponding parts throughout the several views, the numeral 10 indicates the receiving platform which may be made of concrete or other similar material. Supported on the platform 10 are a pair of upstanding angle plates 11 and 12 which serve to limit the lateral travel of the billets 13 as they are delivered from the machine.

The billets from the shearing machine, not shown, are passed along a series of horizontal power-operated conveyor rollers 14 mounted to rotate in suitable bearings in a pair of horizontal guard rails 15 and 16, said guard rails being channel-shaped in cross-section. The guard rails 15 and 16 are supported at the end of the machine by a pair of vertical channel members 17 and 18 resting upon the platform 10, said channel members being connected at their upper portions by an end stop plate 19, the latter serving to prevent the billets from sliding off the end of a tipping plate 20. The guard rails are also supported by a pair of vertical channel members 21 and 22 located beyond the right-hand end of the platform 10, as viewed in Fig. 1.

In order to deflect the moving billets 13 to the left as viewed in Figs. 2 and 3, so that they will pass upon the central portion of the tipping plate 20, which is somewhat narrower than the distance between the guard rails 15 and 16, the guard rail 15 is provided with an offset extremity 23 connected to the main body of the guard rail 15 by an inclined deflecting section 24.

The tipping plate 20 consists of a horizontal channel-shaped member having downwardly extending legs 25, and said channel-shaped member is supported by a pair of levers 26 to which it is secured as by rivets 26ª. The levers 26 are rigidly secured upon a shaft 27 which is parallel to the tipping plate 20 and is mounted to rotate in a pair of bracket members 28 which are secured to the offset portion 23 of the guard rail 15 in any suitable manner, as by rivets 29.

In order to normally maintain the tipping plate 20 in horizontal position, the free ends of the levers 26 are provided with counter weights 30, held in place, as by nuts 31 and bolts 32. A pair of angle blocks 33 lie in the downward paths of the rear ends of the levers 26, as clearly shown in Fig. 2, said angle blocks 33 being mounted rigidly, as by rivets 34, upon a pair of rearwardly extending rectangular brackets 35 secured to the guard rails as by angle strips 36.

In order to support the upper ends of a plurality of inclined rails 37 which serve to guide the billets 13 from the tipping plate 20 to the receiving platform 10, provision is made of a horizontal channel member 38 similar in size to the guard rails 15 and 16 and located vertically below the offset extremity 23, said channel member 38 being secured to said rails as by an angle plate 39. The channel member 38 is rigidly secured in any suitable manner to the upstanding channel members 18 and 21 respectively. The lower ends of the inclined rails 37 rest upon the receiving platform 10 at some distance away from the angle plates 11 and 12 so as to provide room for a considerable number of billets to pile up prior to their removal.

The offset extremity 23 of the guard rail 15 is connected to the guard rail 16 by a rectangular strengthening plate 40, being secured thereto as by screws 41. The rollers 14 are mechanically driven by a power-transmitting shaft 42 having bevel gears 43 meshing with bevel gears 44 on the ends of said rollers outside the guard rail 16. The shaft 42 is mounted to rotate in brackets 46 secured at intervals along the outer side of the guard rail 16.

In operation, as a billet from the shearing machine is passed along over the rollers 14, it will be guided to the left, as viewed in Figs. 2 and 3, by the deflector 24 and caused to slide upon the tipping plate 20. The weight of the billet will cause the tipping plate to swing downwardly from the horizontal full-line position to the inclined dotted line position shown in Fig. 2, further downward movement of the tipping plate being prevented by its contact with the inclined rails 38. The billet will then slide down the inclined rails 38 and be stacked up parallel to other billets upon the receiving platform 10 between the bottom ends of the inclined rails 38 and the stacking brackets 11 and 12. The billets may then be removed easily for any desired further operations.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a billet handling machine, a supporting frame, a conveyor for delivering metal billets thereto in a longitudinal direction, a tipping plate pivoted in said frame and adapted to automatically tilt downwardly under the weight of said billets, and means for causing the billets dropping from said plate when it has tilted to move laterally onto a receiving platform, said tipping plate being in alinement with said conveyor.

2. In a billet handling machine, a supporting frame, a conveyor for delivering metal billets thereto, a tipping plate pivoted in said frame and adapted to tilt downwardly under the weight of said billets, said tipping plate being in alinement with said conveyor, means for causing the billets dropping from said plate when it has tilted to move laterally onto a receiving platform, and means to deflect the billets as they are received from said conveyor outwardly upon said tipping plate.

3. In a billet handling machine, a supporting frame including a pair of upper guard rails, power-driven rollers mounted in said guard rails for transferring metal billets away from a shearing machine, a tipping plate pivoted in said frame in alinement with the direction of delivery of said billets, the weight of said billets causing said plate to tilt downwardly and deliver said billets laterally of said machine away from said tipping plate.

4. In a billet handling machine, a supporting frame, a rod journaled in said frame, a pair of levers rigidly secured to said rod, a tipping plate secured to said levers and adapted to be normally maintained in a horizontal position, means to limit the motion of said tipping plate in both directions, said plate being adapted to automatically swing in the reverse direction and transfer the billet laterally away from said tipping plate when the billet drops longitudinally upon it.

5. In a billet handing machine, a supporting frame, a conveyor for delivering metal billets thereto, a tipping plate in alinement with said conveyor pivoted in said frame and adapted to automatically tilt downwardly under the weight of said billets, means for causing the billets dropping from said plate when it has tilted to move laterally onto a receiving platform, and a pair of stacking plates mounted on said receiving platform to limit the lateral motion of said billets as they slide from said tilting plate for receiving a plurality of said billets.

In testimony whereof, I have affixed my signature to this specification.

GEORGE A. LA ROCQUE.